Nov. 4, 1969 M. N. VRANCKEN 3,476,937

THERMOGRAPHIC RECORDING METHOD EMPLOYING A RECORDING MATERIAL COMPRISING A UNIFORM LAYER OF DISCRETE HYDROPHOBIC THERMOPLASTIC POLYMER PARTICLES

Filed Dec. 29, 1964 4 Sheets-Sheet 1

INVENTOR

Marcel N. Vrancken,

BY Watson, Cole, Grindle & Watson

ATTORNEYS

THERMOGRAPHIC RECORDING METHOD EMPLOYING A RECORDING MATERIAL COMPRISING A UNIFORM LAYER OF DISCRETE HYDROPHOBIC THERMOPLASTIC POLYMER PARTICLES

Filed Dec. 29, 1964 4 Sheets-Sheet 2

INVENTOR
Marcel N. Vrancken,

BY Watson, Cole, Grindle & Watson
ATTORNEYS

INVENTOR
Marcel N. Vrancken,
BY Watson, Cole, Grindle & Watson
ATTORNEYS

Nov. 4, 1969 M. N. VRANCKEN 3,476,937

THERMOGRAPHIC RECORDING METHOD EMPLOYING A RECORDING MATERIAL COMPRISING A UNIFORM LAYER OF DISCRETE HYDROPHOBIC THERMOPLASTIC POLYMER PARTICLES

Filed Dec. 29, 1964 4 Sheets-Sheet 4

INVENTOR

Marcel N. Vrancken,

BY Watson, Cole, Grindle & Watson

ATTORNEYS

United States Patent Office 3,476,937

Patented Nov. 4, 1969

3,476,937

THERMOGRAPHIC RECORDING METHOD EMPLOYING A RECORDING MATERIAL COMPRISING A UNIFORM LAYER OF DISCRETE HYDROPHOBIC THERMOPLASTIC POLYMER PARTICLES

Marcel Nicolas Vrancken, Hove, Belgium, assignor to Gevaert-Agfa N.V., Mortsel-Antwerp, Belgium, a Belgian company Continuation-in-part of application Ser. No. 337,664, Jan. 14, 1964. This application Dec. 29, 1964, Ser. No. 421,861

Claims priority, application France, Dec. 4, 1964, 997,423

Int. Cl. G01n *21/34*; H05g *1/60*; B41c *1/14*

U.S. Cl. 250—65 82 Claims

ABSTRACT OF THE DISCLOSURE

Information is reproduced by the steps of (a) applying a pattern corresponding to the information of heat alone or heat and pressure together to a generally uniform layer on a recording material, such layer either being composed of finely divided particles of a hydrophobic thermoplastic polymer arranged in discrete contiguous relationship or consisting essentially of a dispersed phase of such polymer particles distributed generally homogeneously through a continuous phase of a hydrophilic binding agent applied from an aqueous medium, the amount of the heat or heat and pressure being sufficient to at least partially coalesce the polymer particles in the affected areas of the layer and significantly reduce the fluid permeability of the layer in such areas, and (b) treating the layer to develop or reproduce the information. Preferably the particles are of a synthetic polymer such as polyethylene. The layer or the material otherwise may contain various other materials, such as colorants or color developable agents, and the heat pattern may be created in a variety of ways. A preferred development procedure is to remove with a solvent the unaffected areas of the layer but numerous other modes of development are possible.

The present invention relates to a method for recording information by means of a heat- and/or pressure-sensitive material comprising at least one heat- and/or pressure-sensitive element. This invention relates more particularly to a method for producing by heat or pressure an image-wise or signal-wise irreversible change in physical behavior in the areas where the said element is subjected to a certain degree of heat or pressure. The heat- and/or pressure-sensitive element which will be described more in detail hereinafter undergoes by the action of heat or pressure a decrease of permeability. This means that in said element an image or signal is recorded as a pattern of differences in permeability.

The present application is a continuation-in-part of the patent application No. 337,664 filed Jan. 14, 1964 which is now abandoned.

It is an object of the present invention to provide a heat- and/or pressure-sensitive material suited for recording information respectively for reproducing same.

It is another object of the present invention to provide several embodiments of such type of recording.

It is a further object of the present invention to produce a copy of an original by means of a material according to the present invention exposed to heat or to pressure.

It is a still further object to produce a planographic, letterpress or gravure master by means of a material exposed to heat or to pressure according to the present invention.

It is another object to produce a hectographic master by means of a material exposed to heat or to pressure according to the present invention.

It is still another object to produce a stencil or screen printing master by means of a material exposed to heat or to pressure according to the present invention.

A further object is to produce a master for electrolytic or electrostatic printing by means of a material exposed to heat or to pressure according to the present invention.

These and still other objects as well as advantages of this invention will appear hereinafter and are illustrated by means of drawings which, however, should not be considered as a restriction thereof.

The objects of the present invention are accomplished by record-wise or information-wise subjecting to the action of heat and/or pressure a material comprising at least one sheet or layer containing thermoplastic polymer particles, with or without a continuous binder medium differing from said particles in permeability and/or lyophobicity, but in any case distributed as by coating a support with an aqueous dispersion of hydrophobic particles, thereby to bring about at least at a surface of such sheet or layer a permeable-impermeable and/or lyophilic-lyophobic differentiation according to the information to be recorded.

More especially a method has now been found for recording respectively reproducing information, which method comprises record-wise subjecting to the action of heat and/or pressure a material comprising at least one recording layer or sheet having incorporated therein particles composed wholly or mainly of a hydrophobic thermoplastic polymer, said layer or sheet either substantially entirely consisting of said particles or mainly consisting of a dispersion of said particles in a hydrophilic binder in a ratio greater than 1:1 by weight.

When speaking of a differentiation "according to" the information to be recorded we means that the achieved pattern of differentiating areas constitutes a detectable record of the information determining the heat and/or pressure pattern to which the sheet or layer is exposed. Such exposure may be progressive (in the sense that the exposure of a recording tape to spoken information is progressive), or simultaneous. Assuming for example that the information to be recorded is in the form of written or printed matter, the record in terms of differential lyophobicity and/or permeability may be readable or developable as a record which is positive or negative with respect to the original.

By way of further preliminary explanation, it is pointed out that the differentiation constituting the record may be in terms of the degree of lyophobicity or lyophilicity. In other words it is not necessary for the heat and/or pressure treated sheet or layer to exhibit some areas which are completely lyophobic and some areas which are completely lyophilic. It is also possible for a record to be created in terms of degree of lyophobicity or of lyophilicity. In the same way, an initially permeable sheet or layer may be made selectively impermeable or selectively less permeable.

The particular degree and/or kind or kinds of differentiation necessary in any given case will depend upon the intended use of the differentiation record, in other words on the manner in which this record is to be read or developed. As will be apparent from the following description the invention can be applied in a considerable variety of recording and copying techniques including, e.g., photographic recording and photographic and/or mechanical copying methods. In the description of the various embodiments hereinafter given, two kinds of differentiation are achieved. It is assumed in each case that the heat and/or pressure sensitive sheet or layer is initially permeable and is rendered selectively impermeable or less permeable by the heat and/or pressure treatment, that the polymer particles are hydrophobic, the sheet or layer being prepared starting from an aqueous dispersion of such particles, and, in the event that the sheet or layer comprises a permeable continuous phase constituting a binder medium for the polymer particles, that the binder medium is hydrophilic. These are in fact the intended and preferred conditions but in the light of the foregoing explanations the possibilities for modifying the stated conditions in the individual examples will be evident.

Using a sheet or layer containing particles of a hydrophobic thermoplastic polymer and prepared starting from an aqueous dispersion of said hydrophobic thermoplastic polymer, the said sheet or layer becomes record-wise less permeable by the record-wise modulated action of heat or by the action of record-wise applied pressure. If the said sheet or layer contains a certain amount of hydrophilic material, e.g., a hydrophilic binding agent, the said sheet or layer, depending upon the ratio of hydrophobic thermoplastic dispersed polymer to hydrophilic material, becomes record-wise less permeable and less hydrophilic by the record-wise modulated action of heat or by the action of record-wise applied pressure.

As to the mechanism of recording it is assumed without the intention of restricting the invention hereby, that the finely divided hydrophobic thermoplastic polymer particles, which can be surrounded by a hydration layer or are dispersed in a hydrophilic binder and are in contact or enter into contact with each other during the heating or pressure step, soften or melt by heat or pressure, whereby they form a non-permeable polymer film or net-work of particles sticking to one another.

Having stated in general the concepts of this invention, a detailed description will now be made to the composition and structure of various heat- and pressure-sensitive elements, which form or make part of recording and reproduction materials being an object of the present invention.

FIGURES 1–3 are enlarged sectional views of three different modifications of heat- and pressure-sensitive elements according to the present invention.

FIGURES 4–8 diagrammatically illustrate heat-exposure methods by means of an I.R. radiation source.

Figure 1:
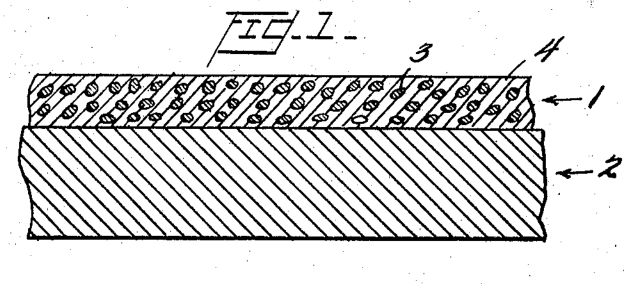

The heat- and pressure-sensitive element can be as illustrated in FIG. 1 a heat- and pressure-sensitive layer 1 which is applied to a support 2 and which comprises dispersed particles of a hydrophobic thermoplastic polymer 3 in a continuous phase of hydrophilic binder 4.

Figure 2:
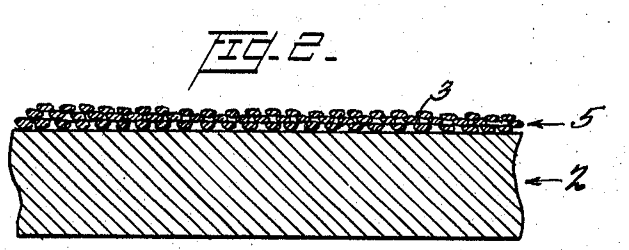

The heat- and/or pressure-sensitive element can further be as illustrated in FIG. 2 a heat- and/or pressure-sensitive substantially dry porous coating 5 essentially consisting of hydrophobic thermoplastic polymer particles 3 on a support 2. The said coating is preferably applied from a latex, so that in that case the polymer particles can be surrounded by a hydration layer which prevents the polymer particles from sticking but which is destroyed by heat.

Figure 3:
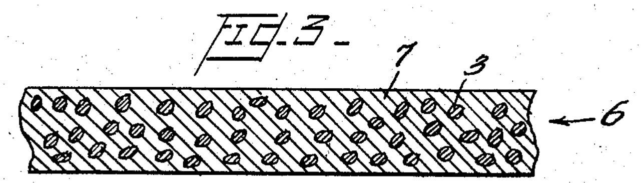

The heat- and/or pressure-sensitive element can further be as illustrated in FIG. 3 a heat- and/or pressure-sensitive self-supporting sheet 6 comprising dispersed particles of a hydrophobic thermoplastic polymer 3 in a continuous phase of a hydrophilic film-forming binder 7.

Materials making up the continuous phase in heat- and/or pressure-sensitive layers or self-supporting sheets according to the present invention are hydrophilic binding agents e.g. hydrophilic natural colloids, modified hydrophilic natural colloids, or synthetic hydrophilic polymers. More particularly they may be selected of such film-forming natural or modified natural hydrophilic colloids as e.g. gelatin, glue, casein, zein, hydroxyethyl cellulose, carboxymethyl cellulose, methyl cellulose, carboxymethylhydroxyethyl cellulose, gum arabic, sodium alginate and hydrophilic derivatives of such colloids. They may also be selected of such synthetic hydrophilic polymers as e.g. polyvinyl alcohol, polyvinyl pyrrolidone, polyvinyl amine, polyethylene oxide, polystyrene sulfonic acid, polyacrylic acid and hydrophilic copolymers and derivatives of such polymers.

The hydrophilic film-forming material used for the manufacture of a heat- and pressure-sensitive recording layer or self-supporting sheet according to the present invention may be hardened for obtaining a higher mechanical strength. Thus, e.g. a film-forming binding agent of the gelatin type may be hardened by reaction with an aldehyde such as formaldehyde or glyoxal. Suited therefore are further alum and hardening agents incorporated directly together with the colloid as an ingredient in the coating composition or applied afterwards by treating the layer or recording sheet with a solution thereof.

Application of the hardening agents as ingredients in the recording layer or sheet composition containing a hydrophilic binder is normally chosen as a function of the desired mechanical strength. The amount of hardening agent may range from 0.5 to 5% by weight. The treatment of the recording layer or self-supporting sheet may be carried out with a solution having a concentration of 2 to 25% by weight of the hardening agent.

The hydrophobic thermoplastic polymer which is the heat-sensitive and pressure-sensitive substance of a recording element according to the present invention has to form a porous layer or water-permeable layer when coated from an aqueous dispersion at a temperature not substantially higher than room temperature and then dried. The polymer particles preferably soften between 10 and 200° C. above room temperature. As examples of suited polymers may be cited polymers having a melting point or a glass-transition temperature between 10 and 200° C. above room temperature. More particularly are suited e.g. polyethylene and polyvinylidene chloride having a melting point of 110 and 190° C. respectively, and the following polymers with their respective glass-transition temperatures: polystyrene (100° C.), polymethylmethacrylate (comprised between 70 and 105° C.), polyethylmethacrylate (150° C.), polyvinyl chloride (near 70° C.), polyacrylonitrile (near 100° C.), polyvinylcarbazole (200° C.).

As is known, the glass-transition temperature can be lowered by the addition of some substances called plasticizers. More particulars about suited plasticizers and the glass-transition temperature of homo- and copolymers can be found e.g., in Georges Champetier, Chimie Macromoléculaire-Généralités, Librarie Armand Colin—Paris Ve, pp. 194–198. It appears therefrom that by copolymerisation or copolycondensation a scale of glass-transition temperatures can be obtained according to the ratio of the monomer or condensation reagents used in the copolymerisation resp. copolycondensation. The molecular weight of the polymers usable in the process according to the present invention may vary within wide limits. Polymers possessing a molecular weight ranging from 5,000 and 1,000,000 are preferred. Polyethlene possessing a molecular weight of between 15,000 and 50,000 appeared to be especially suited. Of course, mixed dispersions of polymer particles are considered also and the different polymer particles occasionally may contain reaction components which at the moment of diffusing into one another because of the application of heat or pressure, react with one another e.g. under color formation.

The hydrophobic thermoplastic homopolymers and copolymers suited for the manufacture of a recording element according to the present invention are applied as an aqueous dispersion which occasionally contains an hydrophilic binding agent. The aqueous dispersion of the homopolymer or copolymer preferably is prepared by radical polymerisation in emulsion of one or more polymerisable monomers according to known techniques, e.g. those described by W. Sorenson and T. W. Campbell, Preparative Methods of Polymer Chemistry, Interscience Publishers, New York (1961). In this radical polymerisation use is made of dispersing agents such as those described by K. Laux, "Die Grenzflächenaktiven Stoffe" in Winnacker-Küchler's "Chemische Technologie" Carl Hanser-Verlag Munich (1960) pp. 155–242.

Aqueous dispersions of polymers, prepared by dispersing a solution of a non-water-soluble polymer in a water-immiscible solvent in an aqueous solution of a hydrophilic binding agent are also considered. As solvents may be mentioned e.g. chlorinated hydrocarbons such as methylene chloride and trichloroethylene.

Further, polymer dispersions which are appropriate for being applied in the present invention can be obtained by dispersing in water mechanically finely divided polymer particles preferably with the help of surfactants and/or hydrophilic protective colloids such as polyvinyl alcohol and gelatin. Latexes obtained by emulsion polymerisation are preferred. In this polymerisation technique the monomer is dispersed by stirring in very fine droplets in the presence of water, emulsifyers (soaps, ammonium oleate, sulfonated fatty alcohols and the like), protective colloids (carboxymethyl cellulose, polyvinyl alcohol and the like), e.g. a buffering system, a surfactant and a water-soluble catalyst e.g. hydrogen peroxide or a persulfate. The polymer is obtained as a stable dispersion of polymer particles in water.

The polymer particles in dispersion may size from $0.01\mu$ to $50\mu$. However, the larger the particles, the less the resolving power on recording. Very good results are obtained with dispersions the dispersed polymer particles of which size from 0.05 to $2\mu$. Dispersions wherein the dispersed particles size from $1\mu$ to $1m\mu$ are considered as colloidal systems. A colloidal system the continuous phase of which is formed by water (dispersing medium) and the dispersed phase is formed by particles sizing from $1\mu$ to $.001\mu$ is called a hydrosol. Good results are obtained when using such hydrosols the polymer particles of which are not greater than $0.1\mu$. Good results are further obtained when using in the recording layer amounts by weight of polymer comprised between 0.5 g. and 10 g./sq. m. The thickness of recording layers according to the present invention preferably varies between $0.5\mu$ and $10\mu$.

As was stated hereinbefore the heat- and pressure-sensitive layer according to the invention not necessarily need contain a binder. The support and/or the drying technique of the layer may be chosen in such a way that a natural adhesion occurs between the layer free of binding agent and the support. A slight sticking (e.g. by heating) of the polymer particles to one another and to the support without serious harm to the porosity of the layer enhances the mechanical strength thereof. Since a binder is not strictly necessary the amount of hydrophilic binder in recording elements according to the present invention can vary between 0% and a relatively high percentage.

The amount of hydrophilic binder is mainly determined by the required hydrophilic-hydrophobic differentiation obtained by the image-wise heat or pressure treatment of the heat- and/or pressure-sensitive layer. It has been found on the one hand that with a weight ratio of 1:1 of hydrophilic binder to hydrophobic thermoplastic binder and more hydrophilic binder no useful results could be obtained hitherto and on the other hand already with a ratio of 2:3 a very marked image-wise change from hydrophilic to hydrophobic and from permeable to impermeable, which is suited for the production of copies as well as for reproduction purposes, is obtained.

Coating of the layers may be accomplished by conventional means such as by a roller coater, brush coater, spraying device, knife coater or by the use of an air-blade to control the thickness and distribution of the coating composition.

According to the purpose of the material the support of the recording layer may be a rigid as well as a flexible member. When flexibility is preferred a sheet element such as e.g. a paper sheet, a plastic film, a metal foil or the like is used. The support may be permeable as well as impermeable e.g. it may be water-permeable such as a web or textile. When flexibility is unimportant, plates of metal, glass, plastics, fiber board, cardboard or the like may be used.

According to their purpose the materials comprising a heat-sensitive element according to this invention may be built up differently. By way of example the heat-sensitive layer occasionally comprising a hydrophilic binder can be applied to a hydrophilic layer which occasionally serves as a support. By hydrophilic layer a layer is understood that is wettable by water or by aqueous solutions. Said layer may be porous or water-permeable. By way of example this hydrophilic layer may be composed mainly of natural or synthetic colloids which are dispersible in water. Examples of such layers are a gelatin layer, a light-sensitive silver halide emulsion layer, a water-permeable nuclei-containing colloid layer for application of the silver complex diffusion transfer process, a baryta-coating comprising gelatin and barium sulfate, a gelatin layer containing pigments or dissolved dyes, or containing reaction components capable to produce a color reaction, a gelatin layer containing developing substances for silver halide or complexed silver halide or a gelatin layer containing finely divided metal that can be etched away e.g. silver.

In addition to a hydrophilic binder occasionally present in the thermosensitive layer, said layer itself may contain all kinds of ingredients such as pigments, electrically conductive particles e.g. metal particles which can be etched away, dyes, e.g. dyes which can be bleached, reaction components for the formation of dyes, catalysts for color reactions, developing nuclei, light-sensitive substances, developing substances for silver halide or complexed silver halide, finely divided metal, reaction components which can be distilled preferably below 80° C., and other image-forming material. Further this layer may comprise hardening agents for the hydrophilic binder and occasionally curing agents which harden the hydrophobic thermoplastic polymer at elevated temperatures.

The heat-sensitive layer occasionally comprising a hydrophilic binding agent can also be applied to a hydrophobic layer which either or not serves as a support. By hydrophobic layer a layer is understood that is not or practically not wettable by water.

Such like layers or supports are made e.g. of cellulose ester derivatives, polyesters, polystyrene, hydrophobic metal, hydrophilic metal coated with a hydrophobic layer e.g. an oxide layer, glass and the like.

Further, the recording layer according to the present invention can be applied between two hydrophilic layers, two hydrophobic layers, a hydrophilic and a hydrophobic layer, between two permeable layers, two impermeable layers, or between a permeable and an impermeable layer.

A layer or sheet being in contact or water-permeable relationship with the thermosensitive sheet or layer may contain ingredients that can be of practical interest to develop the recorded heat image, e.g. pigments, dyes, reaction components for the formation of dyes, developing substances, reaction components or dyes, which can be distilled preferably below 80° C., developing nuclei suited for use in the silver halide diffusion transfer process, catalysts for color reactions, conductive particles and light-sensitive substances.

The process of forming a record according to the present invention results in a record-wise differentiation in permeability of the above described recording layer. So the recording process according to the present invention can be defined in the steps of:

(1) Providing a recording material which contains at least one permeable layer consisting of a substantially dry porous coating of particles essentially consisting of a hydrophobic thermoplastic polymer or a layer comprising said particles dispersed in a hydrophilic binder, said particles preferably softening between 10 and 200° C. above room temperature and sizing preferably of from $0.01\mu$ to $50\mu$;

(2) Record-wise subjecting the recording element to the action of heat and/or pressure whereby according to the degree of the action of heat and/or pressure on said layer, said layer undergoes a decrease in permeability.

The recording according to the present invention can proceed in different ways according to the method by which heat is supplied to the recording element or pressure is exerted on it. Hereinafter follows a survey of several embodiments without limiting, however, the invention thereto.

According to one embodiment an original bearing infrared absorbing indicia is recorded by bringing the heat- and pressure-sensitive element of a recording material according to the present invention into contact with said original and exposing said heat- and pressure-sensitive element while in contact to infrared radiation of such intensity and for such a time as to heat the portions of said element corresponding to said indicia to such a temperature, that by virtue of the absorption of said radiation by the indicia-bearing material the indicia-corresponding portions of the heat- and pressure-sensitive element undergo a substantial loss in permeability relative to the remainder of said layer not corresponding with said infrared absorbing indicia, producing in said element an image of substantial less permeability or impermeability.

The temperature at which the heat- and pressure-sensitive element undergoes a substantial loss in permeability is preferably in the range of 40–200° C.

During exposure to infrared light the original can be placed between the radiation source and the heat-sensitive material, or the heat-sensitive material can be placed between the radiation source and the original. The original bearing the infrared absorbing indicia can be brought in contact with the heat-sensitive element by its back side (support) or by its side bearing the infrared absorbing indicia. When the original is used in contact with the thermosensitive material, it has to be combined therewith in such a way that its heat absorbing portions stand in heat-conductive relationship with the thermoconductive layer. In the case the infrared radiation has to penetrate the heat-sensitive material before reaching the infrared absorbing indicia, it is important that the said material itself transmits said radiation.

In the case the infrared radiation is directed to the back side of the original, it is important that the support bearing the infrared absorbing indicia transmits said radiation.

FIGURES 4–7 illustrate four embodiments of recording using an infrared light source, and wherein the original bearing infrared-absorbing indicia is in contact with a heat-sensitive material according to the present invention.

Figure 4:
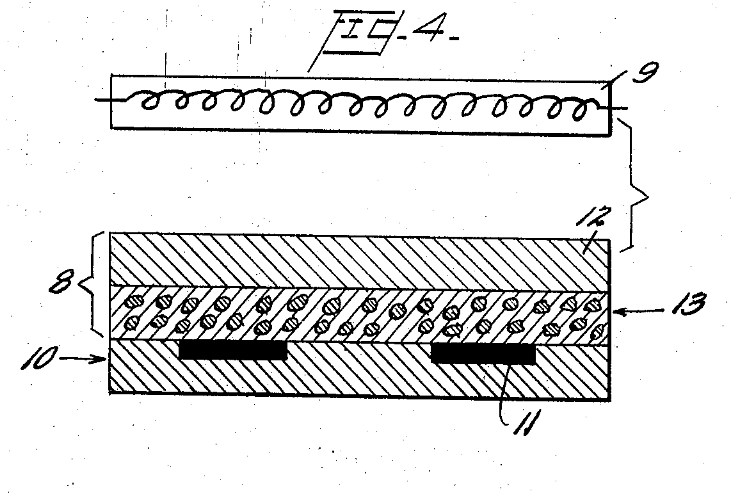

According to FIG. 4 a heat-sensitive material 8 according to the present invention is placed between the infrared radiation source 9 and the original 10 bearing infrared absorbing indicia 11. The support 12 and the heat-senitive layer 13 transmit the infrared radiation.

Figure 5:
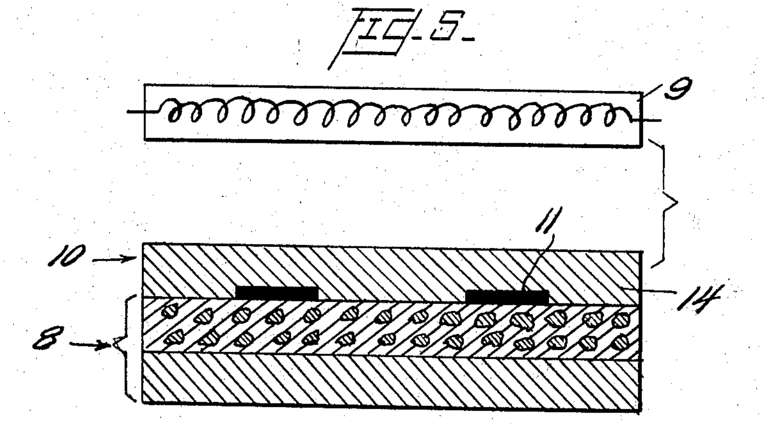

According to FIG. 5 the original 10 is placed between the infrared radiation source 9 and the heat-sensitive material 8. The infrared absorbing indicia 11 are present on a supporting material 14 which transmits infrared radiation.

Figure 6:
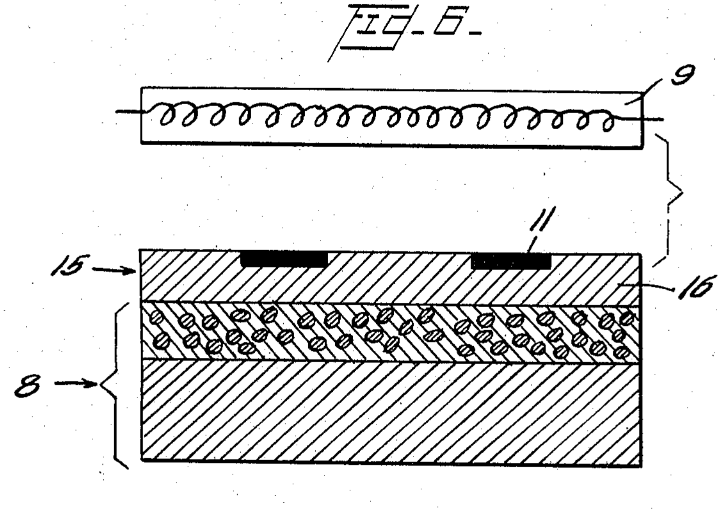

According to FIG. 6 the original 15 is placed between the infrared radiation source 9 and the heat-sensitive material 8. The infrared absorbing indicia 11 face the radiation source 9. The support 16 of the infrared absorbing indicia is thin and heat-conducting. If the support is not thin or is poorly heat-conducting no sharp recording of the original is possible.

Figure 7:
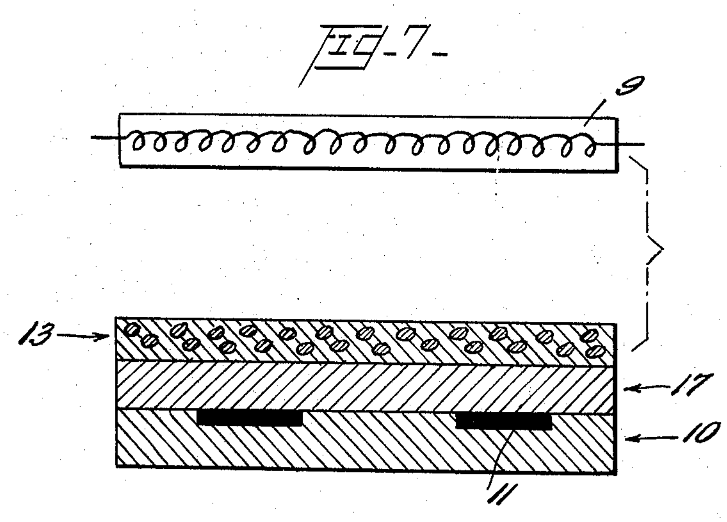

According to FIG. 7 the heat-sensitive layer 13 is facing the infrared radiation source 9 and the support 17 of the heat-sensitive layer 13 during exposure is in contact with the infrared absorbing indicia 11 of the original 10. The support 17 of the heat-sensitive layer 13 is thin and heat-conducting. Suitable supports for the heat-sensitive layers according to the present invention are e.g. the supports of the electrothermographic materials described in the Belgian patent specification 597,778.

According to another embodiment of thermorecording there is no direct contact between a heat-sensitive material and the original. In that case, an original is recorded that transmit infrared radiation image-wise. The heat-sensitive material contains in its heat-sensitive element (layer or sheet) and/or a layer adjacent to this heat-sensitive element a homogeneously divided infrared absorbing substance or substances. The adjacent layer can be e.g. a black paper sheet that during irradiation is pressed against the heat-sensitive layer.

Figure 8:
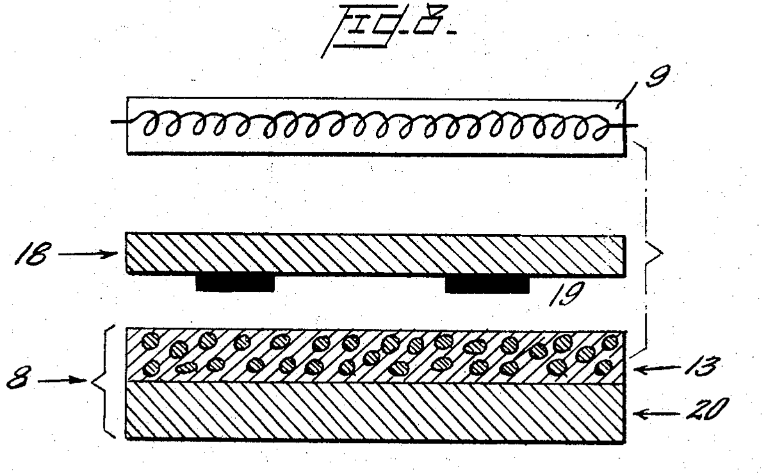

According to FIG. 8 illustrating the last-mentioned embodiment, the original 18 which is an infrared transparency bearing infrared absorbing portions 19 is exposed to infrared radiation by means of an infrared source 9. The heat-sensitive layer 13 is irradiated by the infrared radiation transmitted by the original. The heat-sensitive material 8 preferably contains in its heat-sensitive layer 13 or support 20 a homogeneously divided substance or substances absorbing infrared radiation.

According to a modification of the embodiment illustrated by FIG. 8, a sheet, which is permeable for infrared radiation but not or practically not heat-conductive, can be placed between the original and the thermosensitive layer in contact with both. The result will then be the same as that obtained according to the embodiment illustrated by FIG. 8.

According to still another embodiment of thermorecording a modified form of a recording material according to the present invention is used which contains a photosensitive element, which is e.g. sensitive for electromagnetical radiation selected from the group consisting of X-ray radiation, ultraviolet radiation and visible light, and a heat-sensitive element as described above.

According to still another embodiment of recording by thermo-impermeabilisation, a recording layer according to the present invention can be used in combination with a silver halide diffusion transfer material, e.g. a light-sensitive layer and/or a receiving material containing reduction and/or developing nuclei. Thus, the infrared absorbing indicia can be produced by means of the silver halide diffusion transfer process.

The embodiment using a light-sensitive element comprises forming a negative or positive image of an original in the light-sensitive element.

The image in the light-sensitive element is built up by an infrared-absorbing substance or substances. By exposing the recording material to infrared radiation in such a way that sufficient heat in the infrared-absorbing substance or substances is accumulated and transferred in the heat-sensitive element, the already referred to physical change in permeability is effected. According to whether or not a hydrophilic binder is present in the heat-sensitive element together with the finely divided hydrophobic thermoplastic polymer, a decrease in hydrophility is effected too.

Figure 9:
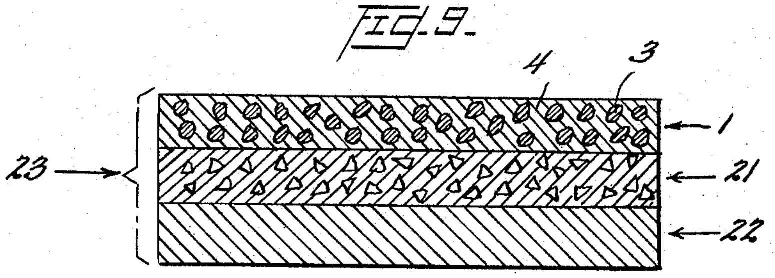
FIGURES 9–10 are enlarged sectional views of recording elements containing a photosensitive layer and a heat- and pressure-sensitive layer according to the present invention.

FIG. 9 represents a material suitable for use according to the latter embodiment of thermo-recording. The recording material 23 contains a heat-sensitive layer 1 comprising hydrophobic thermoplastic polymer particles 3 dispersed in a hydrophilic binder 4. Said heat-sensitive layer 1 is applied to a silver halide emulsion layer 21, which can be e.g. a print-out emulsion layer, a common silver halide emulsion layer of the negative type, or a silver halide emulsion layer of the direct-positive type. The silver halide emulsion layer in its turn is applied to a support 22.

Figure 10:
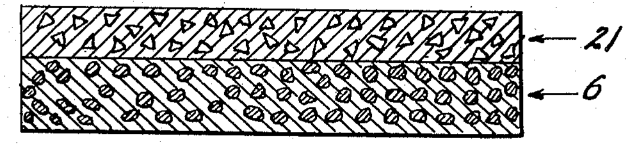

FIG. 10 represents a material that is also suitable for use according to said latter embodiment of thermo-recording. Said material is built up by a silver halide emulsion layer 21 and a self-supporting heat-sensitive recording sheet 6.

Other suited light-sensitive layers that can be used in combination with heat-sensitive layers according to the present invention are described in the United Kingdom patent specification 966,694 which has to be read in conjunction herewith.

A special and preferred combination of a light-sensitive silver halide emulsion layer used in combination with a heat-sensitive layer according to the present invention is a silver halide emulsion layer that is heat-developable in dry state. Heat development of specially composed silver halide emulsion layers is described, e.g. by K. Meyer and F. Lühr, Bild und Ton, Heft 3, 11.Jahrgang, 1958, pp. 62–63. Suitable heat-developable silver halide materials and developing techniques are further described in United Kingdom patent application 930,572, Belgian patent specification 644,163, Belgian patent specification 609,057, our published Netherlands patent application 277,086, and French patent specification 1,322,892.

When a silver halide emulsion layer, which is heat-developable in dry conditions, is used combined with a thermosensitive recording layer according to the present invention, it is possible to effect the development of the latent silver image simultaneously with the formation of the hydrophobic-hydrophilic and/or permeable-impermeable differentation in the thermosensitive element in a completely dry way by means of the same heat source, e.g. an infrared radiation unit.

Example 14 herein illustrates the use of a silver halide material, combined with a thermosensitive recording layer according to the present invention, which material is heat-developable in dry conditions.

For thermo-recording according to the present invention not only infrared radiation but also e.g. high-frequency heating, Joule heat, energetic corpuscular radiation and heat transfer by the contact of warm bodies can be utilised for generating a record-wise heat impermeabilisation in the recording material.

Since the recording elements according to the present invention are not only heat-sensitive but also pressure-sensitive they can be used in a process wherein the permeable-impermeable and/or hydrophilic-hydrophobic image differentation is effected by means of a pressure tool having a relief pattern or image of the information to be recorded and reproduced. In response to pressure as effected by the impact of a typewriter key or writing instrument or by any other force, the thermoplastic hydrophobic polymer particles aggregate and stick together or form a continuous impermeable film of polymer. If the recording element according to the present invention contains a continuous phase of hydrophilic binding agent, a hydrophilic-hydrophobic differentation is produced by pressure whereby the so treated material can be used e.g. as an offset printing plate. When mounted on the duplicating machine for the production of copies, repellent (lithographic solution for increasing the hydrophilicity of the areas which should not take up ink) which is first applied wets out the surface areas which are not struck by the keys of the typewriter. The ink material which is applied later is received only by the pressed portions. Thus the imaged plate, which is first wet out by repellent solution and subsequently treated by ink, receives only ink on the image areas. From the planographic plate the ink is transferred directly to a copy sheet or first to an offset blanket before being transferred therefrom to the copy sheet.

Before giving some examples for practising the method of the present invention, a short survey is given of different systems which are suited for the manufacture of copies and masters for the reproduction of originals starting from a heat- or pressure-imaged recording material according to the present invention. This survey is intended for illustrating the possibilities and advantages of the invention without limiting therefore the scope of this invention.

According to a first system, the image-wise differentiation in permeability and hydrophility is utilised for applying by image-wise diffusion image-forming substance or substances in the recording element by a liquid treatment or from the recording element to a receiving material respectively, said image-wise diffusion being possible as a consequence of this differentiation. By way of example for the first system said imaged recording material is dipped into an aqueous dye solution, whereby the dye diffuses in the recording element (layer or sheet) only on the areas that remained permeable and sufficiently hydrophilic. Of course, a solution of a catalyst for initiating a color reaction between components in the recording material or a solution of a colorless reaction component capable of giving a color reaction with a colorless or slightly colored reaction component in the recording material can be used instead of a dye solution.

By way of another example for the first system it is possible to incorporate in the recording element colored substances which can be bleached out and which are bleached by a bleaching agent diffused in the areas of the recording material that remained permeable. According to an alternative of that system, a conductive substance e.g. a metal that can be etched away e.g. colloidal silver and that is homogeneously dispersed in the recording element, is image-wise etched away by the etching liquid diffusing into the permeable areas. The thermosensitive layer can be applied to an etchable base material, e.g. a resin sheet coated with aluminum. When using this material it is possible to produce a planographic, letter-type or intaglio printing master by etching.

In a second embodiment of image-formation wherein diffusion is applied, the image-forming substance incorporated in the recording material is transferred by diffusion from the areas which remained permeable to an image-receiving material. So, it is possible e.g. to incorporate a soluble dye into the recording element or into a layer being in a liquid-permeable relationship therewith, said dye being capable of diffusing therefrom image-wise to a receiving material when the heat- or pressure-imaged recording element is wetted.

Self-evidently, instead of a dye a colorless reaction component of catalyst for the formation of a color reaction with a reaction component in the receiving material can be incorporated in the recording element.

So it is also possible among others to incorporate into the recording material silver salts which can be complexated and which in their dissolved form can diffuse to a receiving material containing reduction nuclei or development nuclei, whereupon according to the areas of the recording material that remained permeable, silver is deposited image-wise.

In these diffusion methods the image-forming substances such as a dye, a metal that can be etched away or reaction components need not be present in the recording element itself; they can also be incorporated in a layer or support being in a water-permeable relationship therewith.

According to another embodiment the recording material e.g. as a self-supporting sheet, after heat- or pressure-recording can form an image-wise water-permeable membrane, through which, by way of example, an aqueous dye solution can diffuse continuously. In this way a hydrotype master is obtained by means of which several copies of the original can be printed on a transfer material.

Said membrane can also be used for electrolytic printing since the said membrane being in close surface contact with a receiving material as an electrode only transmits electrolyte through the permeable portions with the result that an image-wise electrolytic deposit of image substance is formed on the said electrode material.

According to a second system the areas of the heat- or pressure-imaged recording material that remained permeable are eliminated e.g. by washing out or degrading of the hydrophilic binder, or by eliminating the hydrophobic thermoplastic polymer particles non fixed by heat or pressure. In that case the recording element may comprise a dye e.g. a (colored) pigment or a dissolved dyestuff so that on eliminating by liquid the image areas that remained permeable, a copy of the original is obtained.

By applying said second system a gravure master can be produced starting from a heat- or pressure-imaged recording layer which is applied to a metal support that can be etched. After elimination of the portions of the recording layer that remained permeable and hydrophilic, e.g. by washing out, the uncovered metal can be etched away image-wise. In this way e.g. printed circuits can be produced. After the elimination, e.g. by means of an organic solvent, of the portions of the recording layer containing the polymer particles sticking together, the etched metal plate is ready for being used as a gravure master.

By applying said second system, a letter press master can be manufactured by merely washing away the portions of the heat- or pressure-imaged recording layer that remained permeable and hydrophilic, said washing process occasionally being followed by the hardening of the impermeabilised portions of the recording layer. In this way the impermeabilised portions form a relief image.

When the recording layer is applied to a strongly conductive support e.g. of aluminum, and electrostatic printing plate can be made of this material after heat- or pressure-imaging. By washing away the permeable portions of the recording layer according to the present invention containing e.g. a hydrophilic binder, the conductive material is uncovered image-wise. The portions of the recording layer that were made impermeable possess a considerably higher electric resistivity than the strongly conductive support. By this difference of electric resistivity and by the insulating character of the remaining polymer portions, an electrostatic charge pattern can be formed in accordance with said polymer portions by electrostatically charging. These portions can either be developed in a known way e.g. by powder, or be utilised for the image-wise transfer of electric charges to an insulating transfer sheet. As an alternative, the so treated recording material can be used as an electrostatic printing form or as a material containing a permanent conductivity image (ref. for such material and use thereof: Belgian patent specifications 589,996 and 599,628).

By applying said second system also a stencil or screen-printing master can be manufactured starting from a heat- or pressure-imaged recording material according to the invention. For this technique one or both sides of a screening material are coated with a recording layer or the screening material makes part of a self-supporting sheet as described hereinbefore. As screening material Japan paper (Yoshino paper), nylon fabrics with a size of mesh of 0.2 to 0.08 mm. and woven bronze wire are especially suited (see Example 15).

From the screen-printing technique it is known that only on the open (permeable) areas of the fabric (screening material) ink can pass and deposit on the material to be printed corresponding these areas. The image-wise open areas are obtained according to the present invention by washing out or degrading the recording layer composition except the screening material on the areas where this layer or sheet remained permeable and hydrophilic.

According to a third system the image areas that remained permeable and hydrophilic are transferred onto a transfer material by squeegeeing and tearing out.

This type of transfer is possible if the cohesion of the matter of the transfer material is larger than that of the matter in the permeable areas of the recording layer and if the adhesion between said permeable areas and the transfer material is larger than the cohesion of the matter of said permeable areas.

This transfer successfully occurs when separating after pressing together a wetted heat- or pressure-imaged recording element according to the present invention from a receiving material preferably having a hydrophilic and/or porous surface. In that case the recording material preferably comprises either a recording layer containing a hydrophilic binder wherein the hydrophobic thermoplastic polymer particles are dispersed or a recording layer built up by a porous coating of the said polymer particles applied to a hydrophilic, preferably a colloid layer capable of strongly swelling.

The contrary type of transfer is possible if the cohesion of the matter of the transfer material is less than that of the matter in the permeable areas of the recording layer and if the adhesion between said permeable areas and the transfer material is larger than that of the matter of said transfer material.

E.g. a dye layer of a carbon paper being little hydrophobic on its surface such as is used in the process according to the Canadian patent specification 666,600 after being pressed onto the moistened heat- or pressure-imaged material, can be transferred image-wise to the permeable and hydrophilic areas of the recording material on separating it therefrom. Before pressing the recording material onto a dye layer the hydrophilic binder of said material can be swollen so that a relief image is formed that makes possible a closer contact with the dye layer.

According to this third system it is thus possible to manufacture hectographic masters since the pulled out material can contain a hectographic dye that is soluble in the transfer liquid or can contain a reaction component forming a dye with a reaction component present e.g. in the transfer liquid or transfer material.

According to a fourth system it is possible in the use of a low melting dye in the recording element, to transfer this dye by heating the recording element in contact with a transfer material.

The following examples illustrate the invention.

EXAMPLE 1

The following two compositions are applied at 35° C. to a baryta-coated paper of 175 g./sq. m.

| Composition A: | Ml. |
|---|---|
| 10% aqueous gelatin | 66 |
| Water | 32 |
| Acetic acid | 0.1 |
| Sulfonated castor oil | 1 |
| Mixture of glyoxal and water (1:2) | 1 |

This composition is applied in a proportion of 150 ml. per sq. m.

| Composition B: | Ml. |
|---|---|
| 10% aqueous dispersion of polyethylene having a particle size less than 0.1 $\mu$ and an average molecular weight comprised between 15,000 and 30,000 | 75 |
| 10% aqueous gelatin | 25 |
| Water | 70 |

This composition is roller-coated in a proportion of 50 ml./sq. m. After being dried under 35° C. it forms a heat-and pressure-sensitive layer.

The obtained heat- and pressure-sensitive material with its sensitive layer is brought in contact with the infrared absorbing indicia of an original and exposed to infrared radiation in an apparatus e.g. a "Thermographic Secretary Copying Machine" marketed by Minnesota Mining and Manufacturing Company, St. Paul, Minn., U.S.A. the speed control being set on 7. Due to the selective absorption of the infrared rays in the infrared absorbing indicia of the original, the heat- and pressure-sensitive layer undergoes an image-wise decrease in permeability and hydrophility. In order to increase the differentiation in hydrophility between the areas corresponding with the infrared absorbing indicia and the areas left permeable and not corresponding therewith, the recording layer is rubbed with the following repellent composition:

| | | |
|---|---|---|
| 20% aqueous solution of gum arabic | ml. | 50 |
| Carboxymethylcellulose | g. | 1 |
| Sodium lauryl sulfate | g. | 2 |
| 30% aqueous solution of formaldehyde | ml. | 2 |

Thereupon the treated recording layer is rubbed with a lithographic ink and forms a planographic printing plate ready for printing.

As an alternative, the recording layer before being rubbed with printing ink can be rubbed with a so-called fixer" on the base of oleophilic resins described e.g. in the Belgian patent specification 631,790, such as a fixer of the following composition:

| | | |
|---|---|---|
| Cyclohexanone | ml. | 100 |
| Pentaerythritol ester of colophony having a melt point of 130–137° C. and an acid number of 30–40 | g. | 50 |
| Castor oil | ml. | 20 |
| Toluidine Red R (C.I. 12, 120) | g. | 4 |

By using this fixer the ink receptivity is improved and the number of prints can be increased.

EXAMPLE 2

A text is typewritten on a heat- and pressure-sensitive material manufactured as described in Example 1. The recording layer is made less hydrophilic on the areas struck by the typewriter keys. The material pressure-imaged in this way is then successively treated with repellent and lithographic ink as described in Example 1 and braced on the duplicating machine.

EXAMPLE 3

A heat-sensitive receiving material is prepared by coating the following composition onto the gelatin subbing layer of a support in a proportion of 70 g./sq. m.:

| | | |
|---|---|---|
| 10% aqueous dispersion of polyethylene having a particle size less than 0.1$\mu$ and an average molecular weight comprised between 15,000 and 30,000 | ml. | 75 |
| 10% aqueous solution of gelatin | ml. | 25 |
| Colloidal silver having a particle size below 0.0001$\mu$ | g. | 0.05 |
| Sodium thiosulfate-5-water | g. | 2 |
| 20% aqueous solution of formaldehyde | ml. | 1 |
| Water | ml. | 100 |

Then the material is dried at room temperature.

A light-sensitive negative material suited for diffusion transfer, the silver chloride emulsion layer of which contains 2.6 g. of gelatin per sq. m. and possesses a ratio of gelatin to silver chloride of 1.8, is exposed reflectographically to a line original and developed in a developing solution of the following composition:

| | | |
|---|---|---|
| Water | ml. | 1000 |
| Anhydrous sodium sulfite | g. | 75 |
| Sodium hydroxide | g. | 10 |
| Potassium bromide | g. | 1 |
| Hydroquinone | g. | 16 |
| 1-phenyl-3-pyrazolidone | g. | 1 |

After pressing this developed negative material for 1 minute against the described developing nuclei-containing, heat-sensitive layer of the receiving material in a diffusion transfer apparatus, both materials are separated.

The heat-sensitive layer containing a positive-heat-absorbing silver image is dried and exposed to infrared radiation whereby the heat-sensitive layer in correspondence with the silver containing portions becomes less permeable and less hydrophilic. By treating said layer with repellent and fixer as described in Example 1, a planographic printing plate of excellent quality is obtained which is ready for printing.

EXAMPLE 4

A 7% aqueous solution of gelatin is applied in a proportion of 7 g. of gelatin per sq. m. to a cellulose triacetate support. After drying, the following composition is coated thereon in a proportion of 50 g./sq. m.:

| | | |
|---|---|---|
| 1% aqueous solution of gelatin | ml. | 1000 |
| 40% colloidal aqueous dispersion of polyethylene having a particle size of less than 0.1$\mu$ and an average molecular weight comprised between 15,000 and 30,000 | ml. | 75 |

The layer is dried below 35° C. and the obtained heat-sensitive recording element in contact with an original printed on both sides is exposed to infrared light as illustrated in FIG. 4.

The heat-imaged material is then dipped in a 10% aqueous solution of methylene blue. The dye solution penetrates into the recording layer on the areas that remained water-permeable. The areas of the recording layer that image-wise were made impermeable and hydrophobic by heat do not absorb dye.

When the still wet copy is pressed against a paper sheet as a receiving material at room temperature, a blue negative image is obtained thereon. In this way several negative copies of the side of the original being in contact with the heat-sensitive layer during the infrared irradiation can be made on paper receiving material by diffusion thereon of the absorbed dye. The number of prints depends on the permeability of the gelatin, the nature of the receiving paper, the concentration of the dye solution and the temperature whereby the diffusion occurs.

By incorporating in the bottom gelatin layer a known hardening agent e.g. formaldehyde in an amount of 0.5% by weight of the gelatin, a mechanically stronger material is obtained. As was stated experimentally more than 800 clear copies can be obtained by contacting said material with a rotating cylindrical ink pad moistened with an aqueous dye solution before each contacting with a transfer paper sheet. The treatment with formaldehyde prevents too strong a swelling of the gelatin.

The same results are obtained when replacing the polyethylene dispersion mentioned hereinbefore of the recording layer composition by a 40% aqueous dispersion of polyvinyl chloride particles sizing on the average 0.16$\mu$ and having an average molecular weight of 200,000 or by a 40% aqueous dispersion of polymethylmethacrylate particles sizing on the average 0.12$\mu$ and possessing an average molecular weight of 1,300,000.

EXAMPLE 5

A material composed as described in Example 4 but having a vacuum-deposited copper layer on the cellulose triacetate support is exposed to a printed circuit pattern by means of infrared light as described in that same example. Then the exposed material is treated with a 2% aqueous sodium hypochlorite solution, whereby the areas that remained hydrophilic and water-permeable after the infrared radiation are eaten away. Etching of the copper on the uncovered areas occurs by means of a usual etching liquid comprising iron (III) chloride. In this way a printed circuit is obtained.

EXAMPLE 6

To the gelatin subbing layer of cellulose triacetate support a solution is applied of 70 g. of gelatin and 0.5 g. of the diazonium compound of the formula:

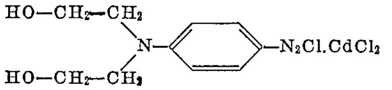

in 1000 ml. of water in a proportion of 100 cm.$^3$ of solution per sq. m. Onto this layer a 30% aqueous dispersion of polystyrene (average particle size 0.13$\mu$, average molecular weight 50,000) is coated in a proportion of 50 g. per sq. m. The polymer layer is dried below 35° C. As schematically shown in FIG. 4, the obtained heat-sensitive material is exposed to an original with infrared light in a "Secretary Copying Machine" marketed by Minnesota Mining and Manufacturing Company, St. Paul, Minn., U.S.A.

The exposed material is then dipped in a freshly prepared aqueous $\beta$-naphthol solution alkalised to pH 10.

This solution penetrates through the portions of the recording layer that remained porous into the diazonium-containing gelatin layer. By the coupling action of $\beta$-naphthol with said diazonium salt an azo dye is formed.

EXAMPLE 7

A solution of 70 g. of gelatin in 1000 ml. of water is coated in a proportion of 7 g. of gelatin per sq. m. on a cellulose triacetate support of 0.14 mm. thickness. To the dried gelatin layer a layer is applied from the following composition in a proportion of 50 g. per sq. m.:

| | | |
|---|---|---|
| Polyvinylalcohol | g. | 10 |
| 40% aqueous dispersion of Polyethylene of Example 1 | ml. | 100 |
| Water | ml. | 900 |

The layer is dried and the material is ready for recording.

An original printed on one side with infrared absorbing indicia is brought in contact with the support of the heat-sensitive material prepared as described above. A sheet of black paper absorbing infrared light is laid on the heat-sensitive layer. Thereupon the sandwich of materials is irradiated with infrared light the original being situated between the light source and the heat-sensitive material. The heat-sensitive layer becomes hydrophobic in correspondence with the non-printed areas of the original. By dipping the heat-imaged recording material in an aqueous solution of methylene blue, the portions that remained hydrophilic are colored blue, so that a positive image of the original is obtained.

EXAMPLE 8

40 g. of carbon black is dispersed in a solution of 70 g. of gelatin in 1000 ml. of water. In a proportion of 7 g. of gelatin per sq. m. this dispersion is applied to a cellulose triacetate support provided with a gelatin subbing layer. After drying, a heat- and pressure-sensitive layer is coated thereon from the following composition:

| | | |
|---|---|---|
| Gelatin | g. | 10 |
| 52% aqueous dispersion of copoly(vinyl chloride/diethyl maleate) (88.6/11.4) particles sizing on the average 0.1$\mu$ with an intrinsic viscosity $[\eta]=0.86$ dl./g. measured at 20° C. in cyclohexanone | ml. | 75 |
| Water | ml. | 900 |

in a proportion of 50 ml./sq. m.

This layer is dried below 35° C. Thereupon the obtained material with its heat- and pressure-sensitive layer is pressed against the polyethylene glycol terephthalate support of a light-sensitive materal bearing an imagewise exposed and developed negative silver halide emulsion layer and is exposed to infrared light, the developed emulsion layer facing the infrared light source. By the infrared irradiation the portions of the recording layer not corresponding with the silver image become hydrophobic with respect to the non-irradiated portions and become less permeable, so that with this material a copy can be obtained as is described in Example 4 or an offset plate as described in Example 1.

EXAMPLE 9

The following two compositions are prepared:

Composition A:

| | | |
|---|---|---|
| Polystrene having an average molecular weight of 5,600 | g. | 45 |
| Methylene chloride | ml. | 240 |
| Wetting agent of the formula $H_{35}C_{17}COO(—CH_2CH_2O)_{50}—H$ | g. | 1 |

Composition B:

| | | |
|---|---|---|
| Gelatin | g. | 10 |
| 5% aqueous solution of sodium lauryl sulfate | ml. | 20 |
| Water | ml. | 500 |

Composition A is then dispersed in composition B. Thereupon the dispersion is heated, whilst normally stirring until the methylene chloride is evaporated completely. The dispersion is then applied in a proportion of 100 g./sq. m. to a polyethylene glycol terephthalate support bearing a subbing layer and a gelatin layer as described in Example 1. After drying below 35° C. a heat- and pressure-sensitive material is obtained that can be utilized in heat- and pressure-recording according to the present invention.

EXAMLE 10

A paper of 135 g./sq. m. is provided with a usual gelatin-containing print-out emulsion layer containing, however, no hardening agent. The composition of such an emulsion is described e.g. in E. J. Wall, Photographic Emulsions, American Photographic Publishing Co. (1929) pp. 106–110 and pp. 237–238. To this emulsion layer another layer is applied in a proportion of 50 g./sq. m. from the following composition:

| | | |
|---|---|---|
| Gelatin | g. | 10 |
| 40% aqueous dispersion of polyethylene having an average particle size below 0.1$\mu$ an a molecular weight comprised between 15,000 and 30,000 | g. | 75 |
| Water | ml. | 950 |

This layer is dried below 35° C. The print-out emulsion layer is exposed to U.V.-light, through a transparency that is mounted in such a way, that a negative laterally reversed image is obtained. Thereupon, the material is irradiated with infrared light in a thermographic printer as mentioned in Example 6.

During this infrared exposure, the heat-sensitive layer becomes impermeable and considerably less hydrophilic in correspondence with the portions of the print-out emulsion blackened with U.V.-light.

(a) The material exposed and thermally treated in this way is pressed against a receiving material viz. art printing paper after slightly being moistened with water. On separating both materials the art printing paper tears out the non-U.V.-exposed portions of the print-out emulsion. In this way a virtually completely dry positive legible print of the original is obtained.

(b) The material exposed and thermally treated in this way after slightly being moistened with water is pressed onto the dye layer of a spirit-duplicating carbon paper sheet that should not be provided with a hydrophobic surface layer. Suited spirit-duplicating carbon papers are described e.g. in U.S. patent application Ser. No. 298,-445 filed July 29, 1963. After pressing both materials together for some 30 seconds, the spirit-duplicating carbon paper is stripped off from the thermographic material.

To the areas of the recording layer that were not exposed to U.V.-light, part of the dye layer is transferred, so that a dye-containing laterally reversed image of the original is obtained thereon. This material carrying said laterally reversed image is used as a spirit duplicating master.

EXAMPLE 11

A 7% aqueous solution of gelatin is applied in a proportion of 7 g. of gelatin per sq. m. to a cellulose triacetate support. After drying, the following composition is coated thereon in a proportion of 50 g./sq. m.:

| | Ml. |
|---|---|
| 1% aqueous gelatin | 1000 |
| 28% colloidal aqueous dispersion of polymethyl methacrylate haivng a particle size less than 0.12μ and an average molecular weight of 130,000 | 54 |
| 28% colloidal aqueous dispersion of polystyrene having a particle size of 0.14 μ and an average molecular weight of 50,000 | 54 |

The layer is dried below 35° C. and the obtained heat-sensitive recording element in contact with an original is exposed to infrared light as illustrated in FIG. 4.

The heat-imaged material is then dipped in an 10% aqueous solution of methylene blue. The dye solution penetrates into the recording layer on the areas that remained water-permeable. The areas of the recording layer that imagewise were made impermeable and hydrophobic by heat absorb no dye.

EXAMPLE 12

To a gelatin subbing layer of cellulose triacetate support is applied a solution of 70 g. of gelatin and 1 g. of Congo-red in 1000 ml. of water at pH 6 in a proportion of 1000 cm.$^3$ per sq. m. To this alyer a layer is applied from the following composition in a proportion of 75 g. per sq. m.:

| | G. |
|---|---|
| Gelatin | 10 |
| 40% dispersion of polyethylene having an average particle size below 0.1μ and an average molecular weight comprised between 15,000 and 30,000 | 75 |
| Water | 950 |

This layer is dried below 35° C. The obtained material is exposed to infrared light, the heat-senstive layer being in contact with an original carrying infrared absorbing indicia. The thermally image-wise impermeabilized material is exposed to hydrogen chloride gas. The hydrogen chloride gas penetrates in the portions of the recording layer that remained permeable and causes therein a color change from red to blue.

EXAMPLE 13

A 7% aqueous solution of gelatin containing per liter 2 g. of infrared-absorbing colloidal silver is applied in a proportion of 7 g. of gelatin per sq. m. to a polyethylene glycol terephthalate support bearing a subbing layer.

After drying, the following composition is coated thereon in a proportion of 50 g./sq. m.:

| | Ml. |
|---|---|
| 1% aqueous solution of gelatin | 1000 |
| 40% colloidal aqueous dispersion of polyethylene having a particle size less than 0.1μ and an average molecular weight comprised between 15,000 and 30,000 | 75 |

The resulting layer is dried below 35° C.

Figure 11:
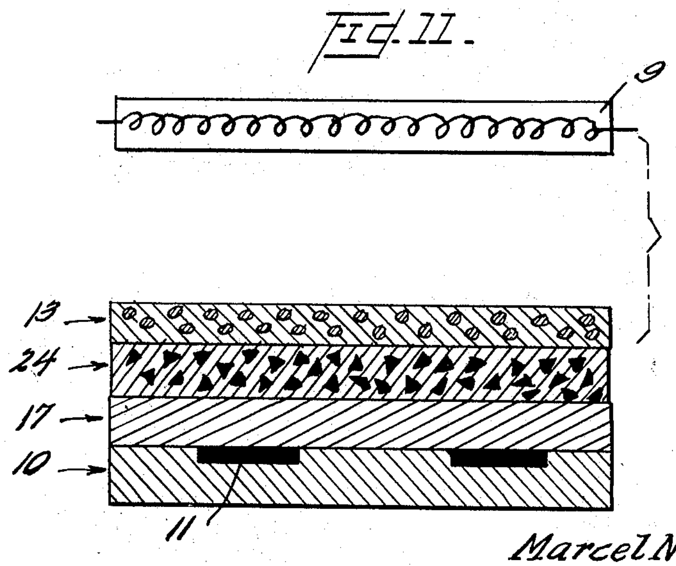
FIGURE 11 illustrates a reflectographic exposure technique wherein an original is reproduced, which image-wise reflects infra-red radiation.

The obtained heat-sensitive recording material is schematically illustrated by FIG. 11. In this figure layer 13 represents the layer containing the heat-sensitive polymer particles, layer 24 is a heat-absorbing layer containing silver particles, layer 17' is a support which does not conduct heat and which is permeable to infrared radiation, whereas the element 10 represents the original comprising infrared-absorbing portions 11 and infrared-reflecting areas, which practically do not conduct heat.

The heat-sensitive recording material is reflectographically exposed to infrared light from a radiation source 9 as illustrated in FIG. 11. The heat-sensitive layer becomes hydrophobic and impermeable to water at the areas corresponding with the areas of the original, reflecting infrared light portions. By treating the thus irradiated recording element in a silver-bleaching bath, a negative copy of the original is obtained.

EXAMPLE 14

A first layer is coated pro rata of 100 g./sq. m. on a water-impermeable paper support of 90 g./sq. m. starting from the following solution:

| | Ccs. |
|---|---|
| 10% aqueous solution of gelatin | 400 |
| Glycerin | 15 |
| 5% solution of 1-phenyl-3-pyrazolidinone in ethanol | 400 |
| Ethanolamine | 6 |
| 11% aqueous solution of saponine | 1 |
| 10% aqueous solution of formaldehyde | 30 |
| Water to | 1000 |

Before coating the first layer, the pH value of the solution is adjusted to 6.5 by means of 10% sulphuric acid.

After drying of the first layer, a second layer is applied thereto pro rata of 100 g./sq. m. from the following suspension:

| | | |
|---|---|---|
| Silver chloride emulsion containing 0.2 mole of silver per kg. | g. | 500 |
| 0.1% solution of 1H-benzotriazole in ethanol | ccs. | 20 |
| 1-phenyl-5-mercaptotetrazole | g. | 0.1 |
| 11% aqueous solution of saponine | ccs. | 5 |
| Water to | ccs. | 1000 |

After drying said light-sensitive layer, a heat-sensitive layer is applied thereto from a solution containing:

| | | |
|---|---|---|
| Gelatin | g. | 5 |
| 40% emulsion of colloidal polyethylene having a particle size less than 0.1μ and an average molecular weight comprised between 15,000 and 30,000 | g. | 75 |
| Water to | ccs. | 1000 |

The resulting light-sensitive material is then reflectographically exposed to an original through the back of the recording material, the indicia to be reproduced of the original facing the heat-sensitive layer. The resulting latent silver image is developed in a dry manner by heating the material for 30 seconds at 80° C. on a glazing press. Subsequently the resulting negative is irradiated by infrared light in a "Thermographic Secretary Copying Machine" as described in Example 1. Through this irradiation and owing to the heat-absorbing properties of the developed silver, the areas of the heat-sensitive copy, which correspond with the developed areas of the emulsion layer, are getting hydrophobic, whereas the other areas stay hydrophilic. In this way a master is obtained, which can be further dipped in a 10% aqueous solution of methylene blue. This dye solution only wets the hydrophilic areas of the master, such that upon pressing of the latter on a common writing paper blank, a positive dye image of the original is formed. In doing so various copies can be obtained, by repeating the wetting of the master with dye solution and each time pressing the master against a paper blank.

EXAMPLE 15

A stencil master is prepared as follows:

A Japan paper weighing 14 g./sq. m. is soaked with a solution consisting of:

| | Ccs. |
|---|---|
| 10% aqueous solution of gelatin | 200 |
| 40% emulsion of colloidal polyethylene having a particle size less than 0.1μ and having an average molecular weight comprised between 15,000 and 30,000 | 100 |
| Water to | 700 |

Upon drying this Japan paper is found to comprise 9 g. of solid substance per sq. m. The thus treated paper, which has become impermeable to stencil ink, is then reflectographically irradiated with infrared light while being in contact with a negative silver image copy of an original to be reproduced. After the image-wise heating, the paper is dipped for 60 seconds in a solution of 2% of Javelle water. In this way, the layer is eaten at those areas, which during the infrared irradiation have been in contact with the non-silver areas of the negative, such that at these areas the Japan paper becomes permeable to fatty ink. After rinsing and drying, a positive stencil master is obtained.

I claim:

1. In a method of recording or reproducing information, the improvement which comprises subjecting a recording material comprising a generally uniform layer of finely-divided particles in substantially discrete, contiguous relationship, which particles consist essentially of a hydrophobic thermoplastic polymer, to heat applied to said particle layer in a pattern according to said information, said heat being in quantity sufficient to at least partially coalesce the particles in the area of the layer corresponding to said pattern and thereby significantly reduce the fluid permeability of said layer in said at least partially coalesced area, and treating said layer to develop or reproduce said information by removing said particles in the area of said layer of substantially unreduced permeability, leaving the partially coalesced area corresponding to said heat pattern.

2. A method as in claim 1 wherein said layer is prepared from an aqueous dispersion of said thermoplastic polymer particles.

3. A method as in claim 1 wherein the said polymer particles soften between 10 and 200° C. above room temperature.

4. A method as in claim 1 wherein said polymer particles are polyethylene particles.

5. A method according to claim 1 wherein said material contains a light-sensitive silver halide in effective contact with said polymer particles.

6. A method as in claim 1 wherein said material contains reducing or development nuclei for silver halide in effective contact with said polymer particles.

7. A method as in claim 1 wherein said material contains a developing agent for silver halide.

8. A method as in claim 1 wherein said material contains a pigment or dye in effective contact with said polymer particles.

9. A method as in claim 1 wherein said material contains a dye-forming reactant in effective contact with such polymer particles.

10. A method as in claim 1 wherein said material contains a color reaction catalyst in effective contact with said polymer particles.

11. A method as in claim 1 wherein said material contains particles of a metal in effective contact with said polymer particles.

12. A method as in claim 1 wherein the information is recorded by the following steps:

(1) bringing the recording material into heat-conductive contact with an original bearing infrared-absorbing indicia to form a sandwich, and (2) exposing one side of the sandwich to infrared radiation of such intensity and for such a time as to heat the corresponding areas of said layer by virtue of the heat resulting from the absorption of said radiation into said indicia, thereby substantially reducing the fluid-permeability of said layer according to said indicia.

13. A method as in claim 1 wherein the information is recorded by the following steps:

(1) exposing a photographic layer which is sensitive to electromagnetic radiation from X-ray to visible light to an image of such radiation corresponding to said information, (2) photographically developing said exposed photographic layer to produce therein a heat-absorbing image corresponding to said radiation image, and (3) exposing the developed layer to infrared radiation, said radiation being absorbed by said heat-absorbing image to create a heat pattern which is applied to said particle layer of said recording material.

14. A method as in claim 1 wherein said layer is subjected to a pattern of infrared radiation.

15. A method as in claim 1 wherein the said layer contains a pigment or dye.

16. A method as in claim 1 wherein said layer contains substances adapted to be bleached or etched away.

17. A method as in claim 1 wherein said layer is applied to an etachable base material and the latter is etched with an etching composition in the area thereof that corresponds with the area of said layer that was removed.

18. A method as in claim 1 wherein said layer makes part of a screening base material and a screen printing master is produced by removing said particles in the portions of said layer that remained permeable after the image-wise heating.

19. A method as in claim 1 wherein said layer is carried on an infrared-transmitting, non-heat conductive support, an image-wise infrared light-reflecting original is placed in contact with said support, and infrared radiation is impinged on said original to image-wise heat said layer by reflection of radiation from said original.

20. The process of claim 1 wherein said layer is treated with an aqueous liquid washing off that portion of substantially unreduced fluid-permeability.

21. The process of claim 1 wherein the polymer of said particles is a synthetic polymer.

22. In a method of recording or reproducing information, the improvement, which comprises subjecting a recording material comprising a generally uniform layer of finely divided particles in substantially discrete, contiguous relationship, which particles consist essentially of a hydrophobic thermoplastic polymer, to heat and pressure applied to said particle layer in a pattern according to said information, said heat and pressure being in quantity sufficient to at least partially coalesce the particles in the area of the layer corresponding to said pattern and thereby significantly reduce the fluid permeability of said layer in said at least partially coalesced area, and treating said layer to develop or reproduce said information by removing said particles in the area of said layer of substantially unreduced permeability, leaving the partially coalesced area corresponding to said heat pattern.

23. A method as in claim 22 wherein said layer is prepared from an aqueous dispersion of said thermoplastic polymer particles.

24. A method as in claim 22 wherein the said polymer particles soften between 10 and 200° C. above room temperature.

25. A method according to claim 22 wherein said material contains a light-sensitive silver halide in effective contact with said polymer particles.

26. A method as in claim 22 wherein said material contains reducing or development nuclei for silver halide in effective contact with said polymer particles.

27. A method as in claim 22 wherein said material contains a developing agent for silver halide.

28. A method as in claim 22 wherein said layer contains a pigment or dye in effective contact with said polymer particles.

29. A method as in claim 22 wherein said material contains a dye-forming reactant in effective contact with such polymer particles.

30. A method as in claim 22 wherein said material contains a color reaction catalyst in effective contact with said polymer particles.

31. A method as in claim 22 wherein said material contains particles of a metal in effective contact with said polymer particles.

32. A method as in claim 22 wherein the said layer contains a pigment or dye.

33. The process of claim 22 wherein said layer is treated with an aqueous liquid washing off that area of substantially unreduced fluid-permeability.

34. A method as in claim 22 wherein said layer contains substances adapted to be bleached or etched away.

35. A method as in claim 22 wherein said layer is applied to an etachable base material and the latter is etched with an etching composition in the area thereof that corresponds with the area of said layer that was removed.

36. A method as in claim 22 wherein said layer makes part of a screening base material and a screen printing master is produced by removing said particles in the portions of said layer that remained permeable after being subjected to said pattern of heat and pressure.

37. The process of claim 22 wherein the polymer of said particles is a synthetic polymer.

38. In a method of recording or reproducing information, the improvement which comprises subjecting a recording material comprising a generally uniform layer applied from an aqueous medium and consisting essentially of a continuous phase of hydrophilic binding agent having distributed therethrough in substantially discrete, generally contiguous relationship a dispersed phase of particles consisting essentially of a hydrophobic thermoplastic polymer, the weight ratio of said polymer particles to said binder being in excess of 1:1 to heat applied to said layer in a pattern according to said information, said heat being in quantity sufficient to at least partially coalesce said particles in the area of said layer corresponding to said pattern and thereby significantly reduce the fluid permeability of said layer in said at least partially coalesced area, and treating said layer to develop or reproduce said information by removing said particles in the area of said layer of substantially unreduced permeability, leaving the partially coalesced area corresponding to said heat pattern.

39. A method as in claim 38 wherein said layer is prepared from an aqueous dispersion of said thermoplastic polymer particles.

40. A method as in claim 38 wherein the said polymer particles soften between 10 and 200° C. above room temperature.

41. A method as in claim 38 wherein said polymer particles are polyethylene particles.

42. A method as in claim 38 wherein said hydrophilic binding agent is gelatin.

43. A method according to claim 38 wherein said material contains a light-sensitive silver halide in effective contact with said polymer particles.

44. A method as in claim 38 wherein said material contains reducing or developing nuclei for silver halide in effective contact with said polymer particles.

45. A method as in claim 38 wherein said material contains a developing agent for silver halide.

46. A method as in claim 38 wherein said material contains a pigment or dye in effective contact with said polymer particles.

47. A method as in claim 38 wherein said material contains a dye-forming reactant in effective contact with such polymer particles.

48. A method as in claim 38 wherein said material contains a color reaction catalyst in effective contact with said polymer particles.

49. A method as in claim 38 wherein said material contains particles of a metal in effective contact with said polymer particles.

50. A method as in claim 38 wherein the information is recorded by the following steps:

(1) bringing the recording material into heat-conductive contact with an original bearing infrared-absorbing indicia to form a sandwich, and (2) exposing one side of said sandwich to infrared radiation of such intensity and for such a time as to heat the corresponding areas of said layer by virtue of the heat resulting from the absorption of said radiation into said indicia, thereby substantially reducing the fluid-permeability of said layer according to said indicia.

51. A method as in claim 38 wherein said layer is subjected to a pattern of infrared radiation.

52. A method as in claim 38 wherein the said layer contains a pigment or dye.

53. A method as in claim 38 wherein said layer contains substances adapted to be bleached or etched away.

54. A method as in claim 38 wherein said layer is applied to an etchable base material and the latter is etched with an etching composition in the area thereof that corresponds with the area of said layer that was removed.

55. A method as in claim 38 wherein said layer makes part of a screening base material and a screen printing master is produced by removing said binding agent and particles in the portions of said layer that remained permeable after the image-wise heating.

56. A method as in claim 38 wherein said layer is carried on an infrared-transmitting, non-heat conductive support, an image-wise infrared light-reflecting original is placed in contact with said support, and infrared radiation is impinged on said original to image-wise heat said layer by reflection of radiation from said original.

57. A method as in claim 38 wherein the information is recorded by the following steps:

(1) exposing a layer which is sensitive to electromagnetic radiation of the group consisting of X-ray, ultraviolet and visible light radiation to an image of such radiation, (2) developing said exposed layer to produce therein a heat-absorbing image corresponding to said radiation image, and (3) exposing the developed layer to infrared radiation, said radiation being absorbed by said heat-absorbing image to create the heat pattern which is applied to said particle containing layer of said recording material.

58. A method as in claim 38 wherein after said material has been subjected to said pattern of heat, said hydrophilic binding agent is dissolved or degraded in the areas of substantially unreduced permeability.

59. A method as in claim 1 wherein the said particle-containing layer after being subjected to said pattern of heat, is brought into pressure contact with a receiving material of a composition having a differential adherence for the permeable and less permeable areas of said particle-containing layer, and is subsequently separated from said receiving material with coincidental transfer to said material of at least a part of said permeable areas of said layer.

60. The process of claim 38 wherein the polymer of said particles is a synthetic polymer.

61. The process of claim 38 wherein said layer after being subjected to said heat pattern, is removed in the areas of substantially unreduced permeability by a wash-off treatment with water or an aqueous liquid which is a solvent for said binding agent.

62. The process of claim 38 wherein said polymer particles are dispersed in said hydrophilic binder by means of a dispersing agent.

63. In a method of recording or reproducing information, the improvement which comprises subjecting a recording material comprising a generally uniform layer applied from an aqueous medium and consisting essentially of a continuous phase of hydrophilic binding agent having distributed therethrough in substantially discrete, generally contiguous relationship a dispersed phase of particles consisting essentialy of a hydrophobic thermoplastic polymer, the weight ratio of said polymer particles to said binder being in excess of 1:1, to heat and pressure applied to said layer in a pattern according to said information, said heat and pressure being in quantity sufficient to at least partially coalesce said particles in the area of said layer corresponding to said pattern and thereby significantly reduce the fluid permeability of said layer in said at least partially coalesced area, and treating said layer to develop or reproduce said information by removing said particles in the area of said layer of substantially unreduced permeability, leaving the partially coalesced area corresponding to said heat pattern.

64. A method as in claim 63 wherein said layer is prepared from an aqueous dispersion of said thermoplastic polymer particles.

65. A method as in claim 63 wherein the said polymer particles soften between 10 and 200° C. above room temperature.

66. A method as in claim 63 wherein said polymer particles are polyethylene particles.

67. A method according to claim 63 wherein said material contains a light-sensitive silver halide in effective contact with said polymer particles.

68. A method as in claim 63 wherein said material contains reducing or developing nuclei for silver halide in effective contact with said polymer particles.

69. A method as in claim 63 wherein said material contains a developing agent for silver halide.

70. A method as in claim 63 wherein said material contains a pigment or dye in effective contact with said polymer particles.

71. A method as in claim 63 wherein said material contains a dye-forming reactant in effective contact with such polymer particles.

72. A method as in claim 63 wherein said material contains a color reaction catalyst in effective contact with said polymer particles.

73. A method as in claim 63 wherein said material contains particles of a metal in effective contact with said polymer particles.

74. A method as in claim 63 wherein the said layer contains a pigment or dye.

75. A method as in claim 63 wherein said layer contains substances adapted to be bleached or etched away.

76. A method as in claim 63 wherein said layer is applied to an etchable base material and the latter is etched with an etching composition in the area thereof that corresponds with the area of said layer that was removed.

77. A method as in claim 63 wherein said layer makes part of a screening base material and a screen printing master is produced by removing said binding agent and particles in the portions of said layer that remained permeable after the image-wise action of heat and pressure.

78. A method as in claim 63 wherein after said material has been subjected to said pattern of heat and pressure, said hydrophilic binding agent is removed in the areas that remained permeable.

79. A method as in claim 22 wherein the particle-containing layer after being subjected to said pattern of heat and pressure, is brought into pressure contact with a receiving material of a composition having a differential adherence for the permeable and less permeable areas of said particle-containing layer, and is subsequently separated from said receiving material with coincidental transfer to said material of at least a part of said permeable areas of said layer.

80. The process of claim 63 wherein the polymer of said particles is a synthetic polymer.

81. The process of claim 63 wherein said layer after being subjected to said pattern of heat and pressure, is removed in the areas of substantially unreduced permeability by a wash-off treatment with water or an aqueous liquid which is a solvent for said binding agent.

82. The process of claim 63 wherein said polymer particles are dispersed in said hydrophilic binder by means of a dispersing agent.

References Cited

UNITED STATES PATENTS

| | | | |
|---|---|---|---|
| 2,240,031 | 4/1941 | Bour | 101—49.5 |
| 2,699,113 | 1/1955 | Hoover | 101—128.4 |
| 2,808,777 | 10/1957 | Roshkind | 101—128.2 |
| 3,100,702 | 8/1963 | Rauner et al. | 250—65.1 |
| 3,131,628 | 5/1964 | Wolfson et al. | 101—128.3 |
| 3,207,602 | 9/1965 | Shely | 250—65.1 |
| 3,223,838 | 12/1965 | Hoshino et al. | 250—65.1 |

RALPH G. NILSON, Primary Examiner

A. L. BIRCH, Assistant Examiner

U.S. Cl. X.R.

101—470; 117—35.5, 35.6, 36.1, 36.7

PO-1050
(5/69)

UNITED STATES PATENT OFFICE
CERTIFICATE OF CORRECTION

Patent No. 3,476,937 Dated November 4, 1969

Inventor(s) Marcel Nicolas Vrancken

It is certified that error appears in the above-identified patent and that said Letters Patent are hereby corrected as shown below:

In the heading to the printed specification, lines 12 and 13, for "Claims priority, application France, Dec. 4, 1964, 997,423" read --Claims priority, application Great Britain, Dec. 5, 1963, 48,128/63, and application France, Dec. 4, 1964, 997,423--.

SIGNED AND SEALED
JUN 9 1970

(SEAL)
Attest:

Edward M. Fletcher, Jr.
Attesting Officer

WILLIAM E. SCHUYLER, JR.
Commissioner of Patents